United States Patent [19]

Nakama et al.

[11] Patent Number: 4,474,906

[45] Date of Patent: Oct. 2, 1984

[54] CARBON FIBER AND RESIN COMPOSITION REINFORCED BY THE SAME

[75] Inventors: Katsumi Nakama; Hiroaki Yamashita, both of Shizuoka; Hirotsugu Kuroda; Mikio Kashimoto, both of Hiroshima, all of Japan

[73] Assignee: Toho Beslon Co., Ltd. & Teijin Chemicals Ltd., Tokyo, Japan

[21] Appl. No.: 459,551

[22] Filed: Jan. 20, 1983

[30] Foreign Application Priority Data

Jan. 22, 1982 [JP] Japan .................................... 57-7542

[51] Int. Cl.³ .............................................. C08K 3/04
[52] U.S. Cl. .................................... 523/205; 523/468; 524/495; 524/496; 524/507; 524/590; 427/407.1; 428/367; 428/368
[58] Field of Search ................. 523/205, 468; 524/495, 524/496, 590, 507; 428/367, 408, 902, 368; 427/407.1

[56] References Cited

U.S. PATENT DOCUMENTS

| 3,671,411 | 6/1972 | Ray et al. | 204/130 |
| 4,061,811 | 12/1977 | Takase et al. | 528/902 |
| 4,328,151 | 5/1982 | Robinson | 524/495 |
| 4,364,993 | 12/1982 | Edelman et al. | 428/367 |

FOREIGN PATENT DOCUMENTS

| 55-132240 | 10/1980 | Japan | 428/902 |
| 57-56586 | 4/1982 | Japan | 523/205 |
| 1227756 | 4/1971 | United Kingdom | 523/205 |

*Primary Examiner*—Lewis T. Jacobs
*Attorney, Agent, or Firm*—Sughrue, Mion, Zinn, Macpeak & Seas

[57] ABSTRACT

A carbon fiber coated with 0.3 to 10 wt. % of a polyurethane resin is disclosed. Also disclosed is a carbon fiber reinforced thermoplastic resin composition consisting preferably of 3 to 60 wt. % of such carbon fiber and 97 to 40 wt. % of a thermoplastic matrix resin. Said carbon fiber has increased gathering properties and adhesion strength to facilitate the mixing with the thermoplastic matrix resin and provides a resin molding having improved mechanical properties, especially increased impact strength.

28 Claims, No Drawings

CARBON FIBER AND RESIN COMPOSITION REINFORCED BY THE SAME

FIELD OF THE INVENTION

The present invention relates to carbon fibers that can be used with a thermoplastic resin to form a composite material, as well as to a resin composition reinforced by such carbon fiber.

BACKGROUND OF THE INVENTION

High-performance engineering plastics materials made of thermoplastic resins reinforced by carbon fibers have recently attracted researchers' attention and the demand for them has increased rapidly. However, the carbon fiber does not have active groups on the surface, so it is inherently inactive and has poor adhesion to a thermoplastic resin. A simple blend of the carbon fiber and the thermoplastic resin has improved mechanical properties over the matrix resin, but the improvement is not great enough to fully utilize the characteristics of the carbon fiber. The poor adhesion between the carbon fiber and the thermoplastic resin has adverse effects on the impact strength of the reinforced resin.

The common method of blending a carbon fiber with a thermoplastic resin is to supply a fiber of a given length (e.g. 10–3 mm) and resin pellets or a resin powder to an extruder and mix the two in a molten state. Unless the fiber has high gathering properties (adhering property of fibers to each other to keep the fibers in the form of a bundle), the fibers "open" (fibers of a part or all of a bundle separate from each other) due to the friction with the resin, and the fluffy fiber floats in the hopper to cause only the resin to be fed into the extruder, and as a natural consequence, it is difficult to have a steady flow of a uniform resin composition. To avoid this problem, the fiber must be given gathering property high enough to prevent opening. One way to increase the gathering property of the carbon fiber is to coat it with a thermoplastic resin the same as the matrix resin. In this case, the coating resin is usually dissolved in a solvent. For example, formic acid or phenol could be used as solvents for polyamide resins, and chlorinated hydrocarbon solvents for polycarbonate, polysulfone, and polyether sulfone. However, these solvents deteriorate the environment in the treating steps, and there are no harmless solvents for these resins. In this respect, it is not desirable to increase the gathering property of the carbon fiber with such resins. To avoid the difficulties mentioned above, a milled fiber not longer than 1 mm could be used, but by the shearing action of the screw in the extruder, the fiber is broken down to shorter lengths, and the average length of the fiber present in the final molding is 0.08 mm or less, which hardly contributes to improving the characteristics of the molding. Therefore, the milled fiber is not suitable for the purpose of obtaining a molding of high strength and modulus of elasticity.

Carbon fibers are generally used in composite materials having an epoxy matrix resin. In this case, the fibers are sized with an uncured epoxy resin and are cut to given lengths for use as a material to reinforce the matrix resin. When the fibers sized with an uncured epoxy resin are used with a thermoplastic matrix resin the sized carbon fibers contacts a heated thermoplastic resin (heating may be necessary to dry the resin) in the hopper, the epoxy resin softens and the fibers are prone to open. This also makes the stable production of a uniform resin composition difficult.

SUMMARY OF THE INVENTION

An object of the present invention is to provide carbon fibers having an excellent gathering property which facilitate the mixing with a thermoplastic matrix resin.

Another object of the present invention is to provide carbon fibers having an excellent adhesion property between the fibers and a thermoplastic matrix resin.

Still another object of the present invention is to provide a carbon fiber reinforced resin composition having high mechanical properties.

The carbon fibers of the present invention are coated with a polyurethane in an amount of 0.3 to 10 wt% based on the weight of the coated fiber.

The carbon fiber reinforced thermoplastic resin composition of the present invention comprises carbon fibers coated with a polyurethane in an amount of 0.3 to 10 wt% based on the weight of the coated fiber and a thermoplastic matrix resin.

DETAILED DESCRIPTION OF THE INVENTION

The carbon fibers having a polyurethane coating according to the present invention has high gathering property, so they can be smoothly fed into the extruder with a thermoplastic matrix resin through a hopper to provide a uniform resin composition. The carbon fibers of the present invention have an improved adhesion property to a thermoplastic matrix resin, therefore, a thermoplastic resin composition reinforced with the fibers provides a molding having good properties, particularly, high impact strength.

The carbon fiber to be coated with the polyurethane resin may be selected from among conventional carbon fibers such as polyacrylic fiber-based carbon fibers, rayon-based carbon fibers and pitch-based carbon fibers, and it may be made of a carbonaceous or graphite material. As in the usual case, carbon fibers the surface of which is oxidized are used with advantage. The oxidation is conducted in order to improve the adhesion property of fibers to polyurethane. For this purpose, for example, an electrochemical oxidation treatment or an oxidation treatment using a concentrated nitric acid heated to a high temperature is applied to carbon fibers. Such oxidation treatments are disclosed in detail, for example, in U.S. Pat. Nos. 3,671,411 and 4,234,398.

The polyurethane resin used in the present invention is a linear polyurethane resin of a "completely thermoplastic" type (the molar ratio of a compound having NCO group to a compound having OH group in the resin is $0.95 \leq NCO/OH \leq 1.0$) and preferably have a molecular weight of 10,000–100,000, more preferably 25,000–70,000 prepared by reacting an isocyanate (A) with a diol (B). Illustrative isocyanates are 1,6-hexane diisocyanate, 4,4'-diphenylmethane diisocyanate, 4,4'-dicyclohexylmethane diisocyanate, tolylene diisocyanate, and isophorone diisocyanate. Illustrative diols include glycols such as ethylene glycol, butylene glycol, 1,6-hexane diol, and bishydroxyethoxybenzene, polyester diols such as polyethylene adipate, polycaprolactone and poly(hexamethyleneadipate), and polyether diols such as polyoxytetramethylene glycol. Polyurethane resins of an "incompletely thermoplastic" type wherein $NCO/OH > 1$ have a tendency to enter into a cross-linking reaction during sizing, and as a result, the carbon fibers come to have an excessively high gathering property and cannot be uniformly dispersed in a thermoplastic resin, especially, one having a low melt viscosity such as a polyamide resin. The carbon fibers are usually used in a form of a strand consisting 500 to 100,000 filaments, preferably 1,000 to 24,000 filaments.

The carbon fibers used in the present invention are coated with 0.3 to 10 wt%, preferably, 2 to 8 wt%, more preferably 3.5 to 6 wt% of the polyurethane resin. If less than 0.3 wt% of the polyurethane is used to size the carbon fibers, the fibers are not given high gathering property and there will be no great improvement in the adhesion between the fibers (coated with the polyurethane) and the thermoplastic matrix resin. If more than 10 wt% of the polyurethane resin is used, the gathering property of the fibers becomes too high to be uniformly dispersed in the thermoplastic resin, and the resulting molding does not have high strength.

The carbon fibers may be coated with the polyurethane resin by the following procedure: the resin is dissolved in a suitable solvent such as methylethylketone or dispersed in water to form an emulsion, and the fibers are immersed in the resulting solution or dispersion, and are recovered therefrom and heated to remove the solvent or water. The coated carbon fibers can also be obtained by dipping the fibers into a molten resin, taking out the fibers therefrom and cooling the fibers coated with the resin.

One method of preparing the carbon fibers suitable for use in the present invention is as follows: substantially continuous carbon fiber strand consisting of a suitable number of filaments is continuously immersed in a solution preferably having 0.5 to 20 wt%, more preferably 0.5 to 5 wt% of the polyurethane resin dissolved in a solvent; then, the carbon fibers are recovered from the solution and passed through a hot-air drying oven at, for example, about 80° C. when methylethylketone is used as a solvent to remove the solvent. The drying temperature may be higher than the melting or softening point of the polyurethane coated on the fibers. Such temperature is especially preferred when an emulsion of the polyurethane is used because the fibers can be uniformly coated with the polyurethane. The dried fibers are cut to suitable lengths when it is subjected to blend with a thermoplastic matrix resin. There is no limitation on the length of the carbon fiber to be blended with the thermoplastic resin, but to facilitate the blending operation, a length preferably between 0.3 to 10 mm, more preferably between 1 to 8 mm, most preferably between 3 to 6 mm.

Examples of the thermoplastic matrix resin that can be used with the carbon fiber are commercially available molding resins such as polycarbonate resins, polyamide resins, thermoplastic saturated polyester resins (e.g. polybutylene terephthalate resin and polyethylene terephthalate resin), polyurethane resins, polyacetal resins, polysulfone resins, polyether sulfone resins, polyphenylene sulfide resins, polystyrene resins, polyolefin resins and polyvinyl chloride resin. Among these, polycarbonate resins, polyamide resins and thermoplastic saturated polyester resins are particularly preferred since they contribute to provide moldings with remarkably improved mechanical properties.

The polycarbonate resins are prepared from aromatic dihydroxy compounds and carbonate precursors (e.g. phosgene and diphenyl carbonate) by the solution method or melting method. Illustrative aromatic dihydroxy compounds include 2,2-bis(hydroxyphenyl)propane (commonly known by bisphenol A), bis(4-hydroxyphenyl)methane, 1,1-bis(4-hydroxyphenyl)cyclohexane, 2,2-bis(4-hydroxy-3-methylphenyl)propane, 2,2-bis(3,5-dibromo-4-hydroxyphenyl)propane, 2,2-bis(3,5-dimethyl-4-hydroxyphenyl)propane, bis(4-hydroxyphenyl)sulfide and bis(4-hydroxyphenyl)sulfone. Preferred polycarbonate resins are 2,2-bis(4-hydroxyphenyl)alkane, and those containing bisphenol A as a major component are particularly preferred. Polycarbonate resin having an average molecular weight of 15,000 to 100,000 are used with advantage.

Illustrative polyamide resins are nylon-6, nylon-6,6, nylon-11, nylon-12 and nylon-6,10. Illustrative thermoplastic saturated polyester resins are polyethylene terephthalate, polybutylene terephthalate and copolyesters containing monomers of these resins as a major component.

The carbon fiber reinforced thermoplastic resin composition according to the present invention comprises preferably of 3 to 60 wt%, more preferably 10 to 40 wt% of the carbon fiber coated with 0.3 to 10 wt% of the polyurethane resin and preferably 97 to 40 wt%, more preferably 90 to 60 wt% of the thermoplastic matrix resin. When the carbon fiber content is less than 3 wt%, it is not sufficiently effective as a reinforcing material, and if more than 60 wt% of the carbon fiber is used, the moldability of the resin composition tends to reduce.

The composition may further contains additives such as an agent which makes the composition flame-retardant (such as halogenated paraffin) or a lubricant such as a silicone oil or powder of a polyfluoro carbon.

The carbon fiber reinforced resin composition is prepared by mixing the carbon fibers having the coating of a polyurethane with a thermoplastic matrix resin under a temperature higher than the temperature at which the thermoplastic matrix resin can be kept at a molten (when crystalline matrix resin is used) or softened state (when non-crystalline resin is used). The temperature upon blending is usually higher than the melting or softening point of the polyurethane on carbon fibers, however, it can also be lower than the melting or softening point so long as the fibers be able to be blended uniformly with the matrix resin. Usually, thermoplastic matrix resin pellets or powder is blend with the carbon fibers which are cut into a proper lengths. The average length of the carbon fibers in the composition is preferably 0.1 to 10 mm. Continuous carbon fibers coated with a polyurethane resin can also be used to form a carbon fiber reinforced resin composition. In such a case, the carbon fibers coated with a polyurethane resin are further coated with a thermoplastic matrix resin by dipping the fibers into a molten or softened thermoplastic matrix resin (this method is similar to a wire coating method) or a solution of a thermoplastic matrix resin. These methods are called undispersed methods.

The present invention is now described in greater detail by reference to the following examples which are given here for illustrative purposes only and are by no means intended to limit the scope of the invention.

EXAMPLE 1

An ester type, completely thermoplastic polyurethane resin having a molecular weight of several tens of thousand and softening point of 160° C. (Crisbon 6216 SL of Dainippon Ink and Chemicals, Incorporated) was dissolved in methyl ethyl ketone. A roving (12,000 filaments) of acrylic carbon fiber of high-strength type was immersed in the polyurethane solution, and transferred to a hot-air drying oven where it was heated at 80° C. to remove the solvent. The dry roving was cut to form chopped strands of carbon fiber 6 mm long. This way, five chopped strand samples having different amounts of sizing agent were prepared by varying concentration of the polyurethane solution.

To each sample, thoroughly dried pellets of nylon-6,6 (2020B of Ube Industries, Ltd.) or a polycarbonate resin (PC) powder (Panlite L-1250P of Teijin Chemicals Ltd.) were added in such a manner that the carbon fibers (having the coating of the polyurethane) content was 30 wt%. A total of 3 kg of the mixture was blended at a room temperature in a tumbler, and the blend was fed to a 40 mmφ vent type extruder from which the mixture was extruded at 280° to 300° C. when Nylon-66 was used and 250° to 280° C. when PC was used) in a form of a molten strand. The strand was cooled and shaped into pellets. Any residual carbon fiber was removed from the hopper and weighed. The results are shown in Table 1. The presence of the residual carbon fiber indicated difficulty in stable production of a uniform resin composition. Same compositions which caused such troubles were charged to the hopper again, and supplied forcively into the extruder using a plastic rod so that make the fibers be able to be extruded with the matrix resin. The five pellet samples each containing 30 wt% of the carbon fiber (coated with the polyurethane) were thoroughly dried and injection-molded to form test pieces. The physical properties of the test pieces are shown in Table 2.

COMPARATIVE EXAMPLE 1

Chopped strands (6 mm long) each of unsized carbon fibers or carbon fibers sized with an epoxy resin (Epikote 828 of Shell Chemicals Corp.) were mixed with nylon-6,6 pellets and fed to an extruder in the same manner as in Example 1. The same chopped strands were also mixed with the polycarbonate resin powder and likewise fed to the extruder. In either case, most of the carbon fibers remained within the hopper and no satisfactory molding could be obtained. The weight of each carbon fiber deposit is indicated in Table 1.

The same mixtures as prepared above were prepared and each mixture was charged into the hopper and forcively supplied into the extruder with a plastic rod. The resulting moldings were thoroughly dried and injection-molded into test pieces. The physical properties of the test pieces are shown in Table 2.

TABLE 1

| Sizing Agent Sizing Amount (wt %) | Example 1 Urethane Resin | | | | | Comparative Example 1 | | |
|---|---|---|---|---|---|---|---|---|
| | | | | | | Un-sized | Epoxy Resin | |
| | 1.2 | 1.5 | 2.8 | 4.5 | 5.5 | 0 | 1.5 | 4.0 |
| Residual Carbon Fiber in Hopper (g) N-66 | 85 | 10 | 0 | 0 | 0 | 1340 | 873 | 215 |
| Residual Carbon Fiber in Hopper (g) PC | 113 | 17 | 0 | 0 | 0 | 1260 | 759 | 189 |
| Concentration of Resin Bath (%) | 1.3 | 1.5 | 2.5 | 4.0 | 4.5 | — | — | — |

(Note)
N-66: Nylon 66
PC: Polycarbonate

TABLE 2

| Sizing Agent | | Example 2 Urethane Resin | | | | | Comparative Example 1 | | |
|---|---|---|---|---|---|---|---|---|---|
| | | | | | | | Un-sized | Epoxy Resin | |
| Sizing Amount | | 1.2 | 1.5 | 2.8 | 4.5 | 5.5 | 0 | 1.5 | 4.0 |
| N-66 | Flexural Strength (kg/mm$^2$) | 32.4 | 33.5 | 34.1 | 33.9 | 32.4 | 27.8 | 29.3 | 30.2 |
| | Flexural Modulus (kg/mm$^2$) | 1890 | 1940 | 1960 | 1930 | 1900 | 1870 | 1850 | 1910 |
| | Izod Impact Strength (notched) (kg · cm/cm) | 6.3 | 7.9 | 8.2 | 7.9 | 6.9 | 4.1 | 5.3 | 5.8 |
| PC | Flexural Strength (kg/mm$^2$) | 23.5 | 23.8 | 25.2 | 24.3 | 23.4 | 22.6 | 23.1 | 23.0 |
| | Flexural Modulus (kg/mm$^2$) | 1550 | 1570 | 1570 | 1560 | 1530 | 1540 | 1550 | 1540 |
| | Izod Impact Strength (notched) (kg · cm/cm) | 8.2 | 8.7 | 9.8 | 9.3 | 7.0 | 8.0 | 7.8 | 7.9 |

EXAMPLE 2

Five chopped strand samples the same as those used in Example 1 were mixed with a well dried polybutylene terephthalate (CL-7000 of Teijin Ltd.) in such a manner that the carbon fiber (coated with the polyurethane resin) content was 30 wt%. Each mixture was blended at a room temperature in a tumbler, and the blend was fed to a 40 mmφ vent extruder from which a molten strand was extruded at a temperature of 220° to 240° C. The strand was cooled with water and shaped into pellets. The resulting five pellet samples were dried at 120° C. for 4 hours and injection-molded into test pieces. The physical properties of the test pieces are shown in Table 3.

COMPARATIVE EXAMPLE 2

The same test pieces were prepared as in Example 2 except that unsized carbon fiber or epoxy-sized carbon fibers that were the same as those used in Comparative Example 1 were used. The physical properties of the test pieces are listed in Table 3.

The data in Table 3 shows that the carbon fiber coated with a polyurethane resin helps produce a uniform mixture with a thermoplastic resin and provide a molding having significantly improved properties.

TABLE 3

| Sizing Agent | Example 2 Urethane Resin | | | | | Comparative Example 2 | | |
|---|---|---|---|---|---|---|---|---|
| | | | | | | Un-sized | Epoxy Resin | |
| Sizing Amount (wt %) | 1.2 | 1.5 | 2.8 | 4.5 | 5.5 | 0 | 1.5 | 4.0 |
| Flexural Strength (kg/mm$^2$) | 28.0 | 28.4 | 29.7 | 28.6 | 27.5 | 25.3 | 27.0 | 27.0 |
| Flexural Modulus (kg/mm$^2$) | 1730 | 1750 | 1740 | 1750 | 1730 | 1700 | 1720 | 1730 |
| Izod Impact Strength (notched) (kg · cm/cm) | 6.4 | 6.5 | 6.8 | 6.7 | 6.2 | 5.0 | 5.2 | 5.3 |

What is claimed is:

1. Carbon fibers coated with 0.3 to 10 wt% of a completely thermoplastic type polyurethane resin.

2. Carbon fibers according to claim 1, wherein said polyurethane resin has a molecular weight of 10,000–100,000.

3. Carbon fibers according to claim 1, wherein the molar ratio of a compound (monomer unit in polyurethane) having an NCO group to a compound having an OH group in the polyurethane resin is $0.95 \leq NCO/OH \leq 1.0$.

4. Carbon fibers according to claim 1, wherein the carbon fibers are in the form of a strand.

5. Carbon fibers according to claim 1, wherein the carbon fibers are in the form of a strand having 500 to 100,000 filaments.

6. A carbon fiber reinforced thermoplastic resin composition comprising carbon fibers coated with 0.3 to 10 wt% of a completely thermoplastic type polyurethane resin and a thermoplastic matrix resin.

7. A resin composition according to claim 6 wherein said thermoplastic matrix resin is a polycarbonate resin, a polyamide resin or a thermoplastic saturated polyester resin.

8. A resin composition according to claim 6 wherein said composition comprises 3 to 60 wt% of carbon fibers coated with the polyurethane resin and 97 to 40 wt% of a thermoplastic matrix resin.

9. A resin composition according to claim 6 wherein said carbon fibers have an average length of 0.1 to 10 mm.

10. A resin composition according to claim 6, wherein said polyurethane resin has a molecular weight of 10,000–100,000.

11. A resin composition according to claim 6, wherein the molar ratio of a compound (monomer unit in polyurethane) having an NCO group to a compound having an OH group in the polyurethane resin is $0.95 \leq NCO/OH \leq 1.0$.

12. A resin composition according to claim 6, wherein the carbon fibers are in the form of a strand.

13. A resin composition according to claim 6, wherein the carbon fibers are in the form of a strand having 500 to 100,000 filaments.

14. A resin composition according to claim 6, wherein the carbon fibers are continuous carbon fibers.

15. A resin composition according to claim 6, wherein the carbon fibers coated with 0.3 to 10 wt% of a polyurethane resin obtained by immersing carbon fibers into a solution or dispersion of a completely thermoplastic polyurethane resin, or by dipping the fibers into a molten completely thermoplastic polyurethane resin.

16. A method for producing a carbon fiber reinforced thermoplastic resin composition comprising:
 (A) Coating carbon fiber with 0.3 to 10 wt% of a completely thermoplastic type polyurethane resin; and
 (B) Incorporating said coated carbon fibers into a thermoplastic matrix resin.

17. A method according to claim 16, wherein said carbon fibers are mixed with a thermoplastic matrix resin under a temperature higher than the temperature at which the thermoplastic matrix resin can be kept at a molten or softened state.

18. A method according to claim 17, wherein said carbon fibers have a length of 0.1 to 10 mm.

19. A method according to claim 16, wherein said polyurethane resin coated carbon fibers are in the form of a continuous strand and are dipped into a molten or softened thermoplastic matrix resin or into a solution of the thermoplastic matrix resin, and then recovered from said molten or softened resin or said resin solution to thereby obtain a continuous carbon fiber strand coated with said matrix resin, said carbon fibers being undispersed in the matrix resin.

20. A method according to claim 16, wherein said polyurethane resin has a molecular weight of 10,000–100,000.

21. A method according to claim 16, wherein the molar ratio of a compound (monomer unit in polyurethane) having an NCO group to a compound having an OH group in the polyurethane resin is $0.95 \leq NCO/OH \leq 1.0$.

22. A method according to claim 16, wherein the carbon fibers are in the form of a strand.

23. A method according to claim 16, wherein the carbon fibers are in the form of a strand having 500 to 100,000 filaments.

24. Carbon fibers coated with 0.3 to 10 wt% of a polyurethane resin obtained by immersing carbon fibers into a solution or dispersion of a completely thermoplastic polyurethane resin, or by dipping the fibers into a molten completely thermoplastic polyurethane resin.

25. Carbon fibers according to claim 24, wherein the polyurethane has a molecular weight of 10,000–100,000.

26. Carbon fibers according to claim 24, wherein the molar ratio of a compound (monomer unit in polyurethane) having an NCO group to a compound having an OH group in the polyurethane resin is $0.95 \leq NCO/OH \leq 1.0$.

27. Carbon fibers according to claim 24, wherein the carbon fibers are in the form of a strand.

28. Carbon fibers according to claim 24, wherein the carbon fibers are in the form of a strand having 500 to 100,000 filaments.

* * * * *